Oct. 25, 1955 B. H. MacLEOD 2,721,356
METHOD FOR SHAPING RUBBER SOLES
Filed May 27, 1952
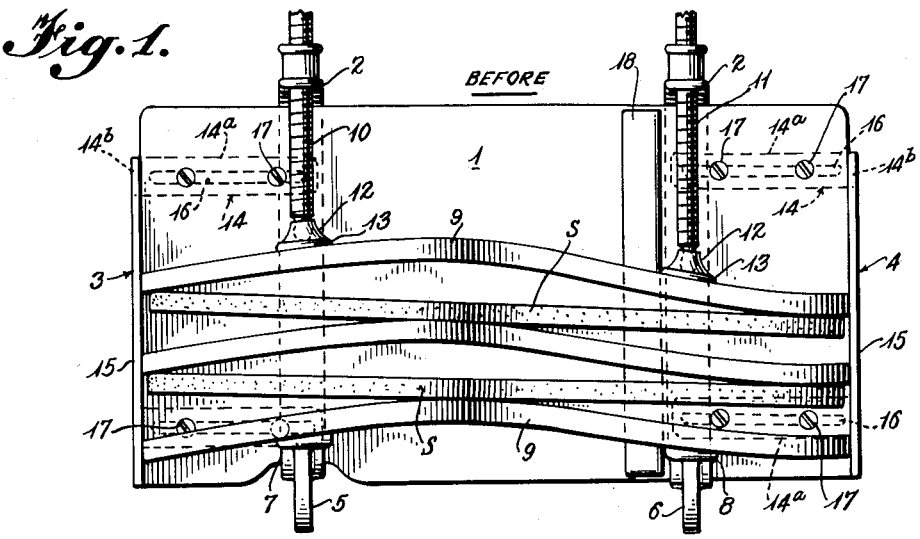
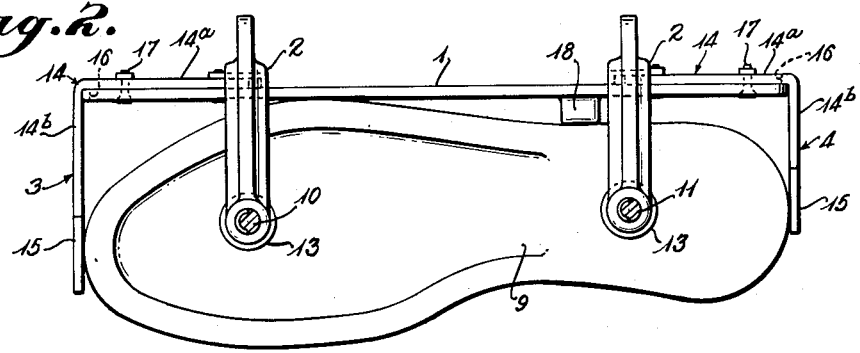
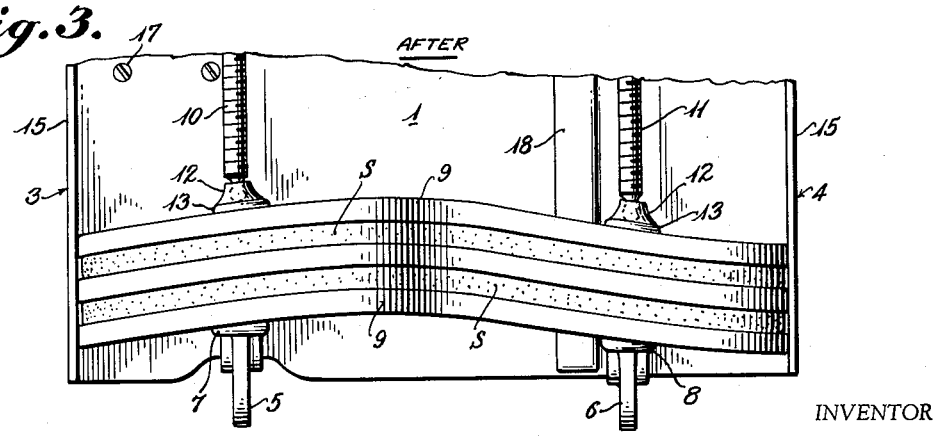
INVENTOR
*Bertram H. MacLeod*
BY *Vernon A. Dorsey*
ATTORNEY

# United States Patent Office 2,721,356
Patented Oct. 25, 1955

2,721,356

METHOD FOR SHAPING RUBBER SOLES

Bertram H. MacLeod, Lima, Ohio

Application May 27, 1952, Serial No. 290,243

1 Claim. (Cl. 18—55)

This invention relates to a method for shaping rubber shoe soles. While the term rubber shoe soles is used in its broadest sense, the soles to be shaped by the method and apparatus contemplate not only rubber soles but soles formed from a mixture of rubber and cork or rubber and fabric, i. e., rubber cord soles. The rubber mentioned above may be either natural or synthetic or a mixture of both.

The present method of making rubber soles is to shape and vulcanize the same in a flat mold having the shape of the sole and design thereon but with a flat or plane surface.

These flat or plane formed rubber soles present difficulties in attaching the same to a shoe, especially as a repair job. This is because the inner sole of a shoe and especially of a used shoe has a curvature between the heel and toe and to affix a flat sole to the shoe, the sole has to be given a curvature to fit the upper.

Heretofore whether the sole was cemented, sewed or nailed to the upper, temporary nails had to be placed through the outer sole and inner sole to curve and hold the flat outer sole to the inner sole for permanent attachment thereto.

My invention contemplates the molding of a rubber shoe sole in a flat mold and while the same is at the temperature required for vulcanization removing the newly molded sole to a press device which shapes the sole to the approximate curvature of the shoe on the last.

I have found that if a flat or plane sole is taken from the forming mold while at approximately the above specified temperature and placed in a form of the desired curvature the sole will become set and retain the shape of the shaping form when cooled and removed from the form.

I have further found that if rubber soles at the temperature stated above are placed between metal shaping members having the curvature desired, the highly polished metal shaping members give a finished shape to the sole and also produce on the outside of the rubber sole a smooth finish which adds to the attractiveness of the sole.

Referring to the drawings wherein the several parts of the device are given identifying reference characters, Fig. 1 is a side view of my device for shaping the hot rubber soles, showing the shape of the rubber soles when they are placed in the shaping device.

Fig. 2 is a top plan view thereof.

Fig. 3 is a side view similar to Fig. 1 but showing the soles taking the shape of the shaping members of the form.

Referring to the drawings, the shaping form for the soles comprises a back board 1 having mounted thereon two clamp members 2 and adjustable end plates 3 and 4.

The U-shaped screw clamp members 2 comprise the bases 5 and 6 which have enlarged portions 7 and 8 to support the lower metal forming member 9. Means for exerting pressure on the rubber soles S comprise the screw shafts 10 and 11 of the U-shaped clamp, the lower ends of said screw shafts having ball and socket connections 12 with enlarged bases 13.

The end plates 3 and 4 comprise an L-shaped portion 14 having the arms 14a and 14b. From the arm 14b there is a downward projecting portion 15. Within the arm 14a of the L-shaped portion 14 there is a slot 16, the purpose of which will be described in detail. Two bolts 17 for each end plate 3 and 4 are mounted in the back board or base 1. By aligning the slots 16 of the L-shaped portion 14a of the end plates, the distance between the downward projecting arm 15 can be adjusted to fit different size rubber soles and the shaping forms for putting pressure on the soles. In other words, the above adjustment allows the form to accommodate and shape different size rubber soles.

To the back board or base member 1 is attached a spacer block 18 to position the individual forming members 9 and the soles therebetween. This spacer block is used because the heel portion of the molds and the heel portion of the rubber soles therebetween are narrower than the forward portion of the sole for the shoe. The end plate arrangement in combination with the back board or base and the filler block 18 stacks the shaping members and the rubber soles interposed between in an orderly manner as the shaping members 9 are placed in the press and the uncured soles interposed between the shaping members.

After molding the individual rubber soles in a flat or plane mold, as is customary, the individual soles are removed from the mold in which they were molded and while at vulcanizing temperature are placed in the sole shaping press by placing the hot soles between the shaping members 9. A hot rubber sole is interposed between each shaping member 9. When a sufficient stack of forming members and rubber soles are in the press, pressure is exerted on the soles by bringing the upper shaping members 9 downwardly until the soles S are compressed and take the shape shown in Fig. 3 of the drawings. The soles remain in the press until they have cooled, at which time they retain the curved shape of the pressing members 9 which is the shape that fits the lasted shape of a shoe.

While I have shown a screw press for exerting pressure to shape hot rubber soles, other means can be used.

What I claim is:

The method of making a rubber shoe sole which comprises vulcanizing a sole in a flat or plane mold having the outline desired for the finished sole and thereafter transferring the flat or plane sole while still at vulcanizing temperature to a press and placing a plurality of so-treated soles in stacked relation between curved forms to give the desired ultimate curvature fore and aft for each of the shoe soles and thereafter retaining the rubber shoe soles in the press until the same are cooled and each retains the shape of the curved forms.

References Cited in the file of this patent

UNITED STATES PATENTS

| Number | Name | Date |
|---|---|---|
| 14,432 | Stratton | Mar. 11, 1856 |
| 138,006 | Cooke | Apr. 22, 1873 |
| 1,048,579 | Preble | Dec. 31, 1912 |
| 1,283,630 | Bean et al. | Nov. 5, 1918 |
| 1,291,880 | Heys | Jan. 21, 1919 |
| 1,589,897 | Reeves | June 22, 1926 |
| 1,785,391 | Russell | Dec. 16, 1930 |
| 1,978,030 | Ritchie | Oct. 23, 1934 |
| 2,487,233 | Gerke | Nov. 8, 1949 |
| 2,549,144 | Truscott | Apr. 17, 1951 |
| 2,647,284 | Richardson | Apr. 4, 1953 |